United States Patent [19]
McNeely

[11] Patent Number: 6,161,570
[45] Date of Patent: Dec. 19, 2000

[54] PILOT-OPERATED RELIEF VALVE

[75] Inventor: Michael D. McNeely, Katy, Tex.

[73] Assignee: Tyco Flow Control, Inc., Houston, Tex.

[21] Appl. No.: 09/323,471

[22] Filed: Jun. 1, 1999

[51] Int. Cl.[7] .................................................. G05D 16/16
[52] U.S. Cl. .............................................................. 137/491
[58] Field of Search ............................................... 137/491

[56] References Cited

U.S. PATENT DOCUMENTS

| | | |
|---|---|---|
| 1,646,640 | 10/1927 | Daniel . |
| 2,417,994 | 3/1947 | Sheets . |
| 2,619,109 | 11/1952 | Garrett et al. . |
| 2,649,115 | 8/1953 | Deardorff . |
| 2,661,017 | 12/1953 | Geiger . |
| 2,890,714 | 6/1959 | Greenwood et al. . |
| 3,211,174 | 10/1965 | Weise et al. . |
| 3,294,111 | 12/1966 | Abercrombie et al. . |
| 3,304,951 | 2/1967 | Farris . |
| 3,399,689 | 9/1968 | Keane . |
| 3,406,712 | 10/1968 | Weise . |
| 3,414,008 | 12/1968 | Greenwood . |
| 3,512,560 | 5/1970 | Weise . |
| 3,568,706 | 3/1971 | Weise . |
| 3,664,362 | 5/1972 | Weise . |
| 3,726,301 | 4/1973 | Schmidt . |
| 3,754,566 | 8/1973 | Gemigniani . |
| 4,172,466 | 10/1979 | Pattarini et al. . |
| 4,355,657 | 10/1982 | Reip . |
| 4,390,041 | 6/1983 | Reip . |
| 4,425,938 | 1/1984 | Papa et al. . |
| 4,848,397 | 7/1989 | Bickford et al. . |
| 4,865,074 | 9/1989 | Bickford et al. . |
| 4,870,989 | 10/1989 | Bickford et al. . |
| 5,769,113 | 6/1998 | Alberts et al. . |
| 5,842,501 | 12/1998 | Powell et al. . |

*Primary Examiner*—Gerald A. Michalsky
*Attorney, Agent, or Firm*—Browning Bushman

[57] ABSTRACT

A pilot operator and a relief valve are provided in the same housing. The pilot-operating mechanism is contained partially within the main closure element of the valve and partially within the valve cap. Inlet pressure to the valve is communicated to the pilot via an access passage extending through the main closure element. In response to high-pressure flow from the inlet, a pilot piston moves a spacer rod through the passage and into engagement with a spring-loaded vent closure. The piston-induced movement of the rod opens the vent to relieve the pressure behind the main closure element, which in turn permits the main closure element to open and relieve the inlet pressure through the valve outlet. Opening of the main closure element terminates flow through the access passage. When the inlet pressure is sufficiently reduced, the pilot piston is unseated by the spring force re-opening the access passage to allow the pressure behind the main closure element to increase and close the main closure element. A back-flow-prevention assembly carried in the main closure element prevents reverse flow of fluids from the outlet to the inlet when the outlet pressure exceeds the inlet pressure.

24 Claims, 4 Drawing Sheets

PILOT-OPERATED RELIEF VALVE

BACKGROUND OF THE INVENTION

1. Field of the Invention

The present invention relates to the field of pilot-operated relief valves. More specifically, the present invention relates to a pilot-operated relief valve assembled in a single housing and having a non-flowing pilot-operated mechanism and a reverse flow prevention valve included as an integral part of the relief valve.

2. Prior Art Setting of the Invention

A well-known prior art design joins a pilot-operated control mechanism with a separate relief valve. The pilot-operated control mechanism is structurally secured to the relief valve with bolts or brackets or other similar attachment structure. The pilot mechanism is functionally connected to the inlet, outlet, and dome pressure areas of the relief valve with appropriate conduits. Such a design is illustrated, for example, in U.S. Pat. No. 3,568,706 to Weise.

Combining a pilot-operated control mechanism and a relief valve through a manifold structure is also taught in the prior art. See, for example, U.S. Pat. No. 5,769,113 to Alberts and McNeely.

The fabrication of pilot-operated relief valves as separate valve and pilot-operating assemblies affords some manufacturing advantages. The manufacture of separate components can increase flexibility in final design configurations and may also contribute to efficiencies in production. The use of separate assemblies for the relief valve and the pilot-operated control mechanism is, however, not without shortcomings. When the pilot-operating system and the relief valve are separate components, provision must be made for mechanically securing the pilot assembly to the relief valve.

Combining two separate structures can produce a relatively large composite assembly when the external dimensions of the combined structure are as large as the combined dimensions of the valve and pilot assembly. Communication must be established with the valve's inlet, outlet, and dome pressure areas, requiring the need for multiple conduits and their associated connections. Material and labor costs associated with the connection of the separate relief valve and pilot-operating mechanism contribute to the total cost of the final assembly. Each of the components required in joining the valve and pilot mechanisms is subject to damage during installation or usage.

Manifolded systems avoid some of the problems associated with separately constructed pilot valve assemblies. The manifolded systems eliminate the need for attachment hardware, pressure-communicating conduits and end connections. Manifolding also permits some reduction in the external dimensions of the composite pilot-operated relief valve assembly. These systems, however, require additional production processes and assembly procedures not required in the modular designs. For example, special manifolded test units are required to pre-test the pilots before they are installed. Another shortcoming is that the pilot-to-body sealing surfaces in the manifolded design are subject to corrosion damage that can render both the manifold and the valve body unusable.

The prior art also discloses unitary valve designs in which the primary pressure-responsive pilot components are installed in the valve cap so that the pilot-operating mechanism is an integral part of the valve structure. An example of such a valve may be seen in U.S. Pat. No. 2,890,714 to Greenwood and Francis. The valve is compact and provides a pilot-operated relief valve function without the need for a separate modular or manifolded configuration. The pilot-operating mechanism of the Greenwood et al. valve senses inlet pressure through an access passage extending through the main closure element. As the main valve opens to relieve high pressure, fluid flows through the access passage. Valves of this type are referred to as "flowing pilots".

Pilot-operated relief valves employing flowing pilots are associated with various shortcomings that limit their general usefulness. Undesired fluid loss can occur as the valve is relieving pressure. The flow of fluid through the access passage may also erode or otherwise damage the pilot-operating mechanism. Particulate matter in the flowing fluid can also obstruct the flow passages and other internal components within the pilot-operating mechanism.

SUMMARY OF THE INVENTION

The pilot-operated components and the valve components of a non-flowing, pilot-operated pressure relief valve are integrated into a common structure to produce a compact, protected assembly having reduced fabrication and maintenance costs. The integrated assembly includes a back-flow-preventer that precludes reverse flow of fluids through the relief valve when the valve's outlet pressure exceeds its inlet pressure.

The pressure relief valve of the present invention deploys a pilot-operated system partially within the main valve closure element and partially within the valve cap. A pressure-sensing passage extending through the main valve closure element communicates inlet pressure to pressure-sensitive components of the pilot-operated system contained in the valve cap. The pressure sensing passage is closed to fluid flow when the valve is relieving pressure.

A back-flow-prevention assembly carried in the primary closure element of the relief valve prevents reverse flow of fluids through the relief valve.

The present invention provides operating and control mechanisms for a non-flowing, pilot-operated pressure relief valve having a snap-acting pilot valve and a fixed closing pressure actuation in an integral valve assembly in which the pilot-operating components of the valve are carried in the main valve closure element and the valve cap.

From the foregoing, it may be appreciated that a primary object of the present invention is to provide a pilot-operated pressure relief valve in a unitary assembly in which the pilot-operating components and the flow control components of the valve are contained within a single structure.

Another object of the present invention is to provide a pilot-operated pressure relief valve in which a pilot-operating system and a relief valve are assembled in a single housing structure and in which a portion of the pilot-operating system is carried in the primary valve closure element of the relief valve.

It is an object of the present invention to provide a pilot-operated pressure relief valve that eliminates the need for external connectors to combine the operations of the valve with a separate pilot-operating system.

Yet another object of the present invention is to combine the operations of a pilot-operated relief valve in a unitary structure without employing a manifold section between the pressure-sensitive pilot-operating system and the relief valve closure element.

An important object of the present invention is to provide a pressure-operated relief valve having a back-flow-prevention mechanism that precludes the reverse flow of fluids through the relief valve when the valve outlet pressure exceeds the valve inlet pressure. A related object of the present invention is to deploy a back-flow-prevention mechanism in the primary valve closure element of the relief valve.

A general object of the present invention is to provide a pilot-operated reliefvalve having a non-flowing, snap-action pilot valve, a back-flow-prevention mechanism, and a fixed closing pressure setting, all deployed within the main valve closure element and the cap of the relief valve.

The foregoing, as well as other, objects, features, and advantages of the present invention will be more fully understood and appreciated by reference to the following drawings, specification, and claims.

DESCRIPTION OF THE ILLUSTRATED EMBODIMENTS

Figure 1:
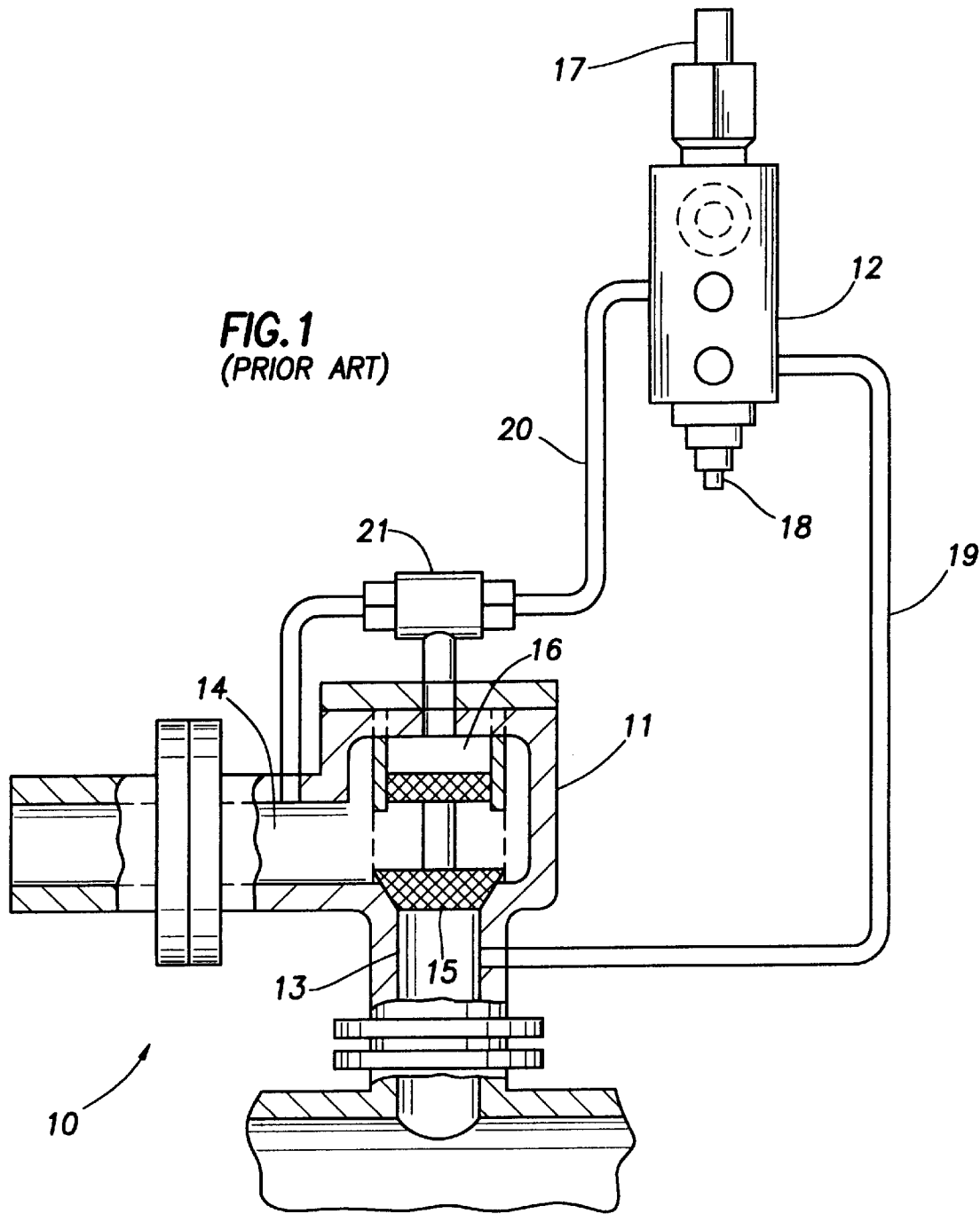
FIG. 1 is a vertical elevation illustrating a pilot-operated pressure relief valve of the prior art.

A prior art pilot-operated pressure relief valve assembly is indicated generally at 10 in FIG. 1. Details in the construction and operation of the assembly are described in the previously mentioned patent to Weise, which is incorporated herein by reference. The assembly 10 includes a primary valve component 11 and a separate pilot-operated component 12. The valve component 11 regulates the flow of fluid between a valve inlet 13 and a valve outlet 14. In operation, a main valve closure member 15 moves away from the closed position illustrated in FIG. 1 to an open position, permitting pressure communication between the inlet 13 and the outlet 14. Pressure behind the closure member 15 in a domed area 16 acts with the pressure in the area of the inlet 13 to move the closure member 15 between open and closed positions.

The pilot-operating component 12 regulates the pressure in the dome 16, which in turn regulates movement of the main valve closure member 15. The pilot-operating component 12 operates conventionally in providing a decrease in the pressure of the dome 16 when the pressure at the inlet exceeds a value selected by a setting mechanism 17 in the pilot-operating mechanism. Adjustment of a second setting mechanism 18 establishes the inlet pressure at which the valve closure member 15 recloses.

Conduits 19 and 20 establish pressure communication between the valve component 11 and the pilot-operating component 12. The conduit 19 extends between the valve inlet 13 and the pilot component 12. The conduit 20 extends from the pilot component 12 to a back-flow-prevention device 21 that in turn communicates with the valve dome area 16 and the valve outlet 14. The valve inlet pressure is communicated to the device 21 by the conduit 20.

The back-flow-prevention device 21 communicates the higher of the pilot supplied inlet pressure or the valve outlet pressure to the dome 16. When the outlet pressure exceeds the pressure supplied from the pilot component, the valve closure member 15 remains closed to prevent reverse flow through the valve component 11.

The described prior art valve assembly efficiently provides a snap-acting, nonflowing, pilot-operated reliefvalve including back-flow-prevention. The valve assembly suffers, however, from its requirement for multiple connection lines with associated potential leak points, separate attachment structure for physically securing the valve and pilot components together, a space requirement sufficiently large to accommodate the separate pilot, back-flow-prevention device, and valve components, and the requirement for a large number of parts for the separate mechanisms of the major operating components.

Figure 2:
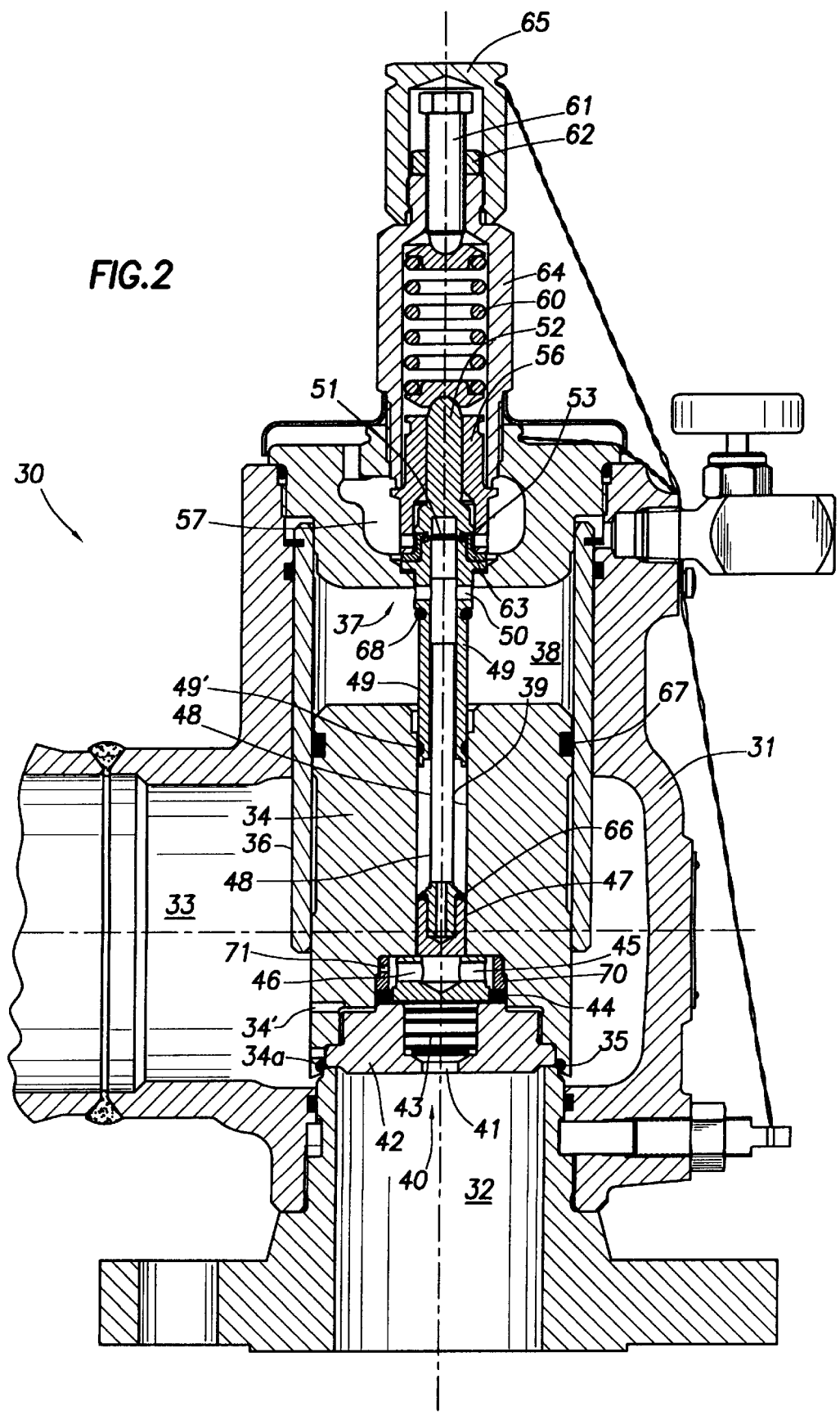
FIG. 2 is a vertical elevation, partially in section, illustrating an exemplary embodiment of the pilot-operated pressure relief valve of the present invention in closed position.

FIG. 2 of the drawings illustrates an embodiment of the relief valve assembly of the present invention indicated generally at 30. The assembly 30 includes a main valve housing 31 having an inlet opening 32 and an outlet opening 33. A main valve closure element 34 is illustrated in closed position against a valve seat 35, sealing the inlet 32 from the outlet 33. An annular, elastomeric seal ring 34a carried at the bottom of the piston 34 provides the seal with the seat 35. The closure element 34, which is in the form of a cylindrical piston, is movable axially within a surrounding piston sleeve 36. A valve cap assembly indicated generally at 37 encloses the top of the sleeve 36. The top of the valve closure element 34 and the valve cap assembly 37 define a dome chamber 38 within the sleeve 36.

The primary pressure-responsive pilot components for the valve 30 are carried in the main valve cap assembly 37. Inlet pressure is communicated from the inlet 32 to the pilot components in the cap assembly 37 through a central access passage 39 extending axially through the main valve closure 34.

A back-flow-preventer assembly, indicated generally at 40, is carried within the main valve closure element 34 at the base of the access passage 39. As will be described hereinafter in greater detail, the pressure at the inlet 32 is communicated across the back-flow-preventer assembly 40 to the access passage 39 and the dome 38. When the inlet pressure is sufficiently high, the pressure contained within the dome 38 is selectively vented through the valve cap assembly 37 to the atmosphere through a vent path to be hereinafter described.

The fluid pressure in the inlet 32 begins its communication with the dome 38 through a port 41 formed centrally within a seat retainer 42 engaged in the bottom of the main valve closure 34. The pressure fluid passes through a screen 43, past a non-sealed, annular, elastomeric seal ring 44, to a back-flow-preventer shuttle 45. The pressure then passes around the outer annular periphery of the shuttle 45, through shuttle ports 46, and around the perimeter of a non-cylindrical reseat piston 47 into the access passage 39. Pressure in the access passage 39 communicates with the dome 38 through the clearances between a spacer rod 48 and a pilot nozzle 49 extending into the access passage 39.

Figure 3:
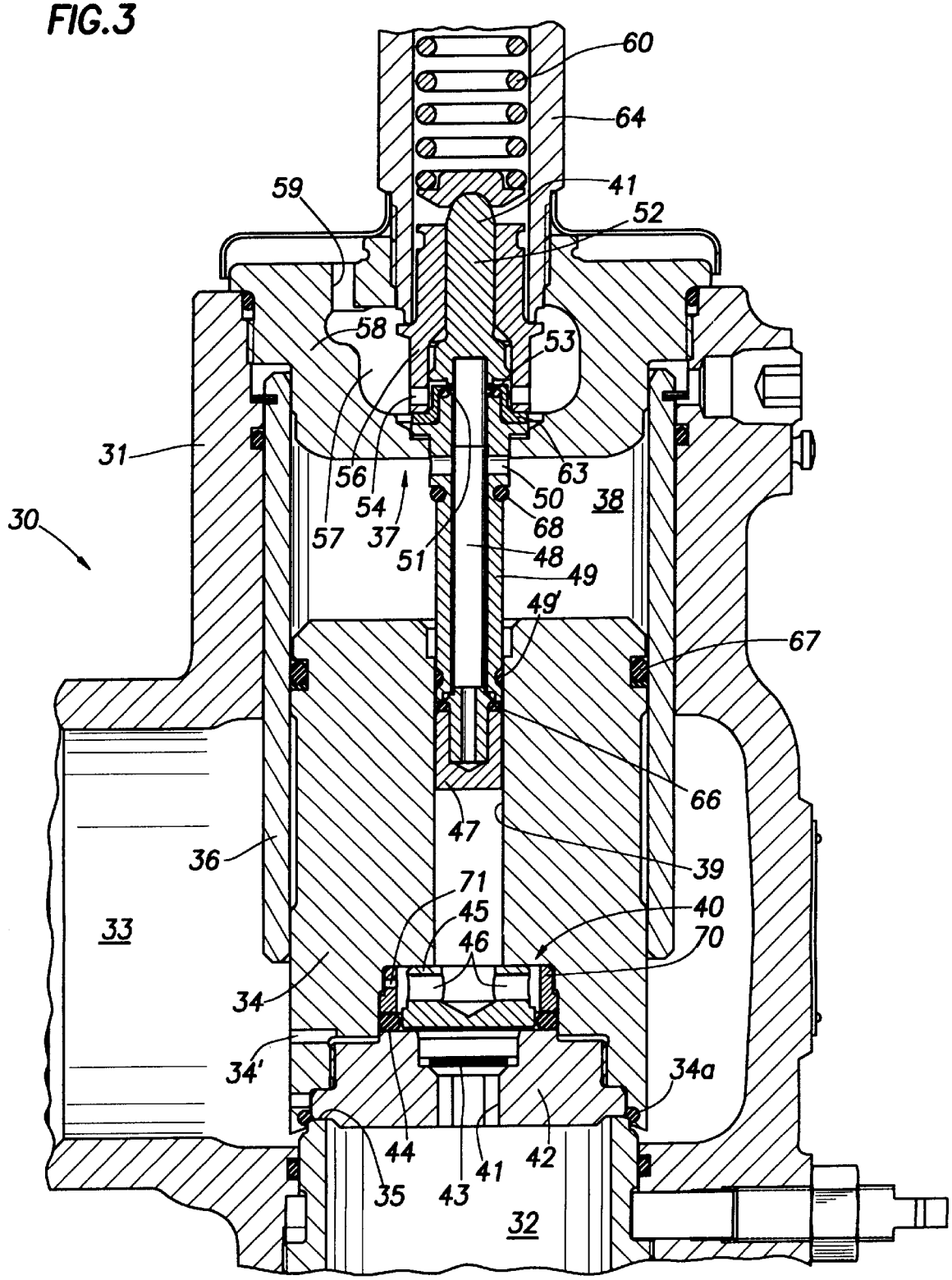
FIG. 3 is the valve of FIG. 2 illustrated immediately before being moved into open position.

When the pressure at the inlet 32 is sufficiently high, pressure in the dome 38 is vented into the atmosphere through a vent passage provided through ports 50 in the pilot nozzle 49, through the clearance between the rod 48 and the pilot nozzle 49, and through a vent valve opening 51 formed between an unseated spindle 52 and an annular, elastomeric seal ring seat 53. The vent valve opening 51 is best illustrated in FIG. 3 in which the spindle 52 is illustrated elevated slightly above the seal ring seat 53. The pressure escaping through the ring seat 53 communicates through radial ports 54 formed in a spindle guide 56 into a cavity 57 formed in a valve cap body 58. The pressure in the cavity 57 is vented to the atmosphere through an axial port 59.

As will be described more fully hereinafter, the compressive force of the spring 60 exerted against the spindle 52 determines the inlet pressure at which the main valve closure element 34 opens. The spring compression is adjusted by advancing or retracting a threaded bolt 61 to respectively increase or decrease the spring compression. The bolt is held in its adjusted positioned by a lock nut 62.

The spindle 52 is supported for axial movement within the spindle guide and carried within the main valve cap body 58. A pilot seat retainer 63 secures the seal ring 53 in place against the top of the pilot nozzle 49. The spindle guide 56 and pilot seat retainer 63 are held in place by a bonnet 64 containing the adjustment spring 60, the adjustment bolt 61, and the lock nut 62. A protective cover 65 seals the bonnet 64.

In operation, the pilot spindle 52 is lifted off the ring seat 53 when the pressure in the inlet 32 exceeds a predetermined pressure established by the compression of the adjustment spring 60. Opening of the ring seat 53 vents the pressure in the dome 38 to the atmosphere. The differential pressure created across the pilot spacer rod 48 and the reseat piston 47 between the shuttle ports 46 and the ring seat 53 causes the pilot spacer rod and the reseat piston to move upwardly until the reseat piston 47 engages the lower seating surface of the pilot nozzle 49 as illustrated in FIG. 3.

Once the pilot nozzle is engaged by the reseat piston 47, a seal ring 66 carried about the reseat piston seals with the pilot nozzle to restrict the pressure communication passage to that existing between the external surface of the pilot nozzle 49, surrounding nozzle, a guide bushing 49', and the internal surface of the access opening 39. This restriction in the pressure communication passages is accompanied by an increase in the upwardly directed force exerted by the reseat piston 47 against the spacer rod 48. The length of the rod 48 is such that the seal ring seat 53 and the reseat seal 66 cannot be simultaneously engaged with their respective sealing members.

In the position illustrated in FIG. 3, the spring force in the spring 60 is opposed by the pressure in the shuttle ports 46 acting on the seat area formed by the reseat piston seal ring 66. The spindle 52 is held off of the ring seal seat 53 when the differential pressure acting against the reseat piston 47 is greater than the spring force of the spring 60. Lifting of the spindle 52 relieves the pressure in a the dome 38 which in turn permits the pressure differential acting across the main closure element 34 to lift the closure element 34 off of the main valve seat 35. An annular, elastomeric seal ring 67 carried externally of the main closure element 34 limits pressure communication across the element 34 to the access opening 39. The main closure element 34 moves upwardly to a maximum upward position in response to the reduced pressure in the dome chamber 38 as pressure bleeds out through the opened vent passage. Once the main closure element 34 lifts away from the seat 35, the fluid pressure at the inlet 32 communicates directly with the outlet 33 to relieve the higher inlet pressure.

Figure 4:
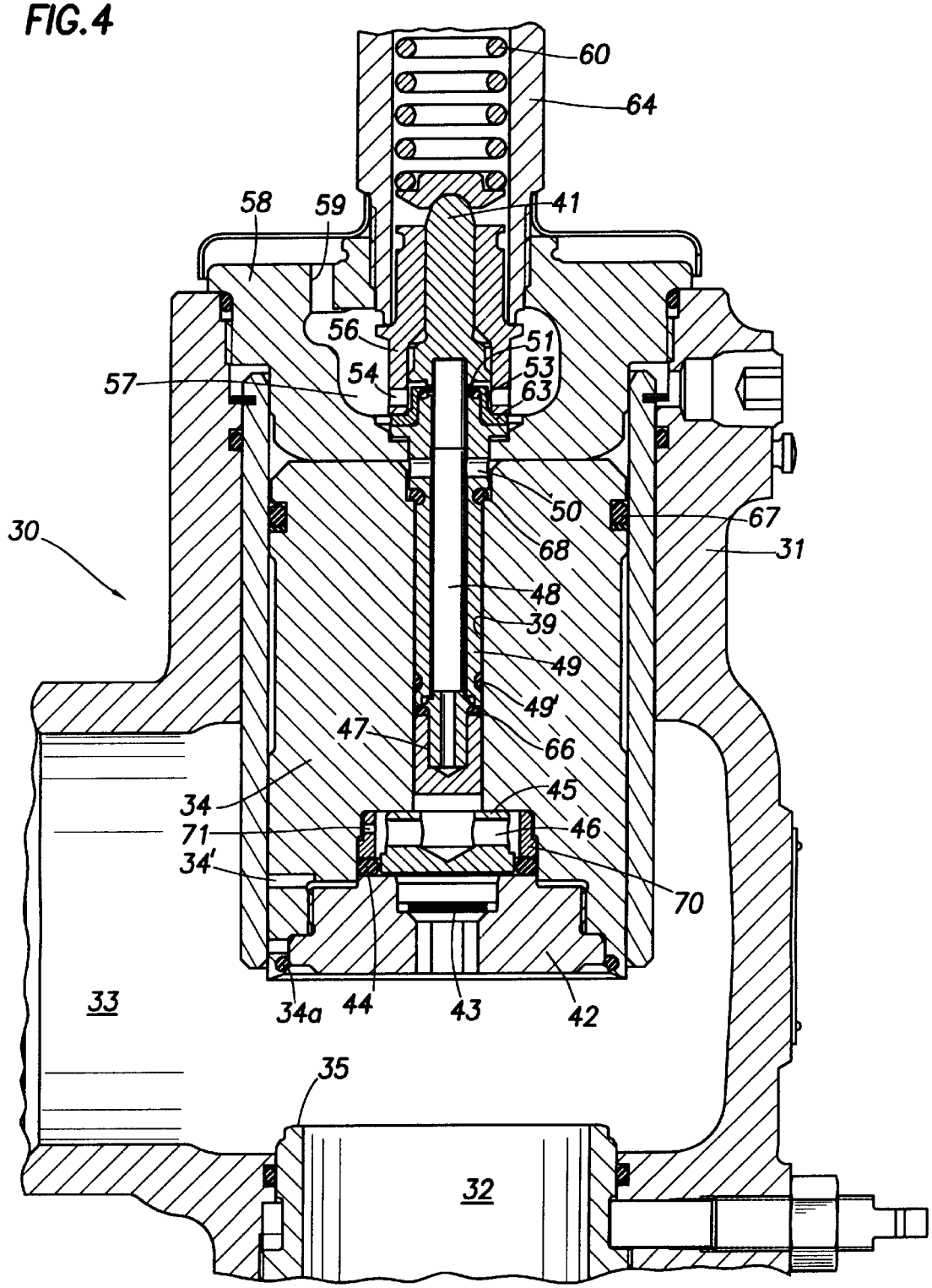
FIG. 4 is the valve of FIG. 2 illustrated in its fully open position.

At the top of its axial movement, indicated in FIG. 4, a recessed area in the access opening 39 at the top of the main closure element 34 engages an elastomeric, annular seal ring 68. The seal ring 67 cooperates with the seal ring 68 to terminate all pressure communication across the closure element 34. In this position, the reseat piston 47 senses only the static pressure exerted by the fluid pressure at the inlet 32.

Once the pressure at the inlet has been reduced to a predetermined lower pressure ("blowdown pressure"), the reseat piston 47 moves back to its lower position along with the pilot spacer rod 48. Retraction of the rod 48 permits the pressure-responsive spindle 52 to move back down to its lower seated position against the seal ring seat 53, which closes the vent passage of the pressure dome 38. Closing the vent passage from the pressure dome 38 allows the pressure at the inlet 32 to re-pressure the dome chamber 38. When the pressure in the dome chamber 38 equalizes with the inlet pressure, the larger area of the piston seal 67 forces the main closure element 34 to return to its lower, seated position, stopping the pressure discharge from the inlet 32.

During the period when the main closure element is in its upward position, relieving pressure from the inlet 32, such as illustrated in FIG. 4, no flow is permitted in the pilot from the inlet 32 to the pressure dome 38. The pilot thus functions as a non-flowing pilot system during the relief cycle of the main closure element. As noted previously, the spindle seal ring seat 53 and the reseat piston seal 66 cannot be simultaneously engaged due to the relative length of the pilot spacer rod 48 and the pilot nozzle 49. This arrangement provides the desired reseating pressure to be achieved and eliminates the possibility of pressure isolation of the pressure-responsive spindle 52 from the pressure source at the relief valve inlet 32.

The integrated back-flow-preventer 40, carried in the base of the main closure element 34, prevents the valve assembly 30 from flowing in reverse from the outlet to the inlet when the outlet pressure exceeds the inlet pressure. The preventer 40 allows the higher pressure of either the valve inlet or the valve outlet into the dome chamber 38. When the pressure at the inlet 32 is higher than the pressure at the outlet 33, the preventer seal ring 44 is moved to seal on its extreme outside diameter due to the pressure differential between its inside and outside diameters. The higher relative pressure acting on the inside diameter of the seal 44 at the inlet to the port 41 causes it to a stretch radially outwardly into contact with the surrounding bore through the main closure element 34 at its installed location within the main closure element base. This allows flow to the pressure dome 38 and seals off leakage to the main valve outlet 33, When pressure in the outlet 33 is greater than that at the inlet 32, the pressure at the external radial surfaces of the seal ring 44 acting through main valve-piston ports 34' causes the seal ring to move radially inwardly and seal on the external annular surface of the preventer shuttle 45. This in turn prevents leakage into the inlet 32 and permits the outlet pressure to communicate with the pressure dome 38. The pressure differential acting on the seal ring 44 results from a light axial pressure applied to the seal ring as it is slightly compressed between the bottom surface of a preventer spacer 70 and the top surface of the seat retainer 42. A small radial port 71 in the preventer spacer 70 creates the pressure differential acting on the seal ring 44 while allowing pressure differentials across the seal ring to change back and forth as described.

While the invention has been particularly shown and described with reference to a preferred embodiment thereof, it will be understood by those skilled in the art that various changes and modifications in form and details may be made without departing from the spirit and scope of the invention.

What is claimed is:

1. A pilot-operated relief valve for relieving pressure from a vessel, comprising:

an axially extending main valve closure element movable axially between closed and open positions for respectively closing and opening a discharge path from said vessel, said main valve closure element having a first pressure-responsive seal area at its first axial end selectively sealing said path communicating with said vessel and a second pressure-responsive seal area at its second axial end selectively communicating with a control dome area whereby a pressure differential between said first and second pressure responsive seal areas tends to move said main valve closure element axially;

a pilot-sensing passage extending through said main valve closure element between said first and second pressure-responsive seal areas for communicating the fluid pressure of said vessel to said control dome area;

a sensing passage restriction body movable in response to the pressure in said vessel to a position restricting said passage whereby said main valve closure element is opened when said vessel pressure meets or exceeds a selected pressure value; and a sensing passage closure seal for preventing flow through said sensing passage when said main valve closure element is opened.

2. A pilot-operated relief valve as defined in claim 1 wherein said sensing passage restriction body comprises a sensing piston movable through said sensing passage for restricting said sensing passage when said vessel pressure meets or exceeds said selected pressure differential.

3. A pilot-operated relief valve as defined in claim 2 wherein the pressure in said control dome is vented to a lower pressure area when said sensing piston restricts said sensing passage whereby said main valve closure element is moved axially by the pressure differential between said first and second pressure-responsive seal areas to open said discharge path.

4. A pilot-operated relief valve as defined in claim 2, further comprising an adjustable biasing member for resisting the movement of said restriction body to said position restricting said passage whereby said biasing member may be adjusted to select said selected pressure value.

5. A pilot-operated relief valve as defined in claim 1, further comprising an adjustable biasing member for resisting the movement of said restriction body to said position restricting said passage whereby said biasing member may be adjusted to select said selected pressure value.

6. A pilot-operated relief valve as defined in claim 1, further comprising a sensing passage seal operable when said main valve closure element is in said open position for completing the seal of said sensing passage whereby said control dome is sealed from said vessel.

7. A pilot-operated relief valve as defined in claim 1 wherein said main valve closure element and said pilot-sensing passage are co-axially aligned in a unitary valve housing.

8. A pilot-operated relief valve as defined in claim 7, further comprising a back-flow-preventer carried in said unitary valve housing for preventing the reverse flow of pressure fluid between said outlet and said inlet when the pressure at said outlet exceeds the pressure at said inlet.

9. A pilot-operated relief valve as defined in claim 1, further comprising a back-flow-preventer carried in said main valve closure element for preventing the reverse flow of pressure fluid between said outlet and said inlet when the pressure at said outlet exceeds the pressure at said inlet.

10. A unitary pilot-operated relief valve assembly for controlling the pressure of a fluid contained in a vessel, comprising:

a valve housing having an inlet and an outlet;

a main valve closure member contained in said housing, said closure member moveable between open and closed positions for respectively permitting and preventing pressure communication between said inlet and said outlet;

a pressure-responsive pilot operator contained in said housing for controlling the movement of said main valve closure member between said open and closed positions;

a pressure-sensing passage extending through said main valve closure member for communicating pressure at said inlet to said pilot operator; and a pressure-responsive passage seal for closing said pressure-sensing passage to flow of fluid when said main valve closure member is in said open position; and a back-flow-preventer carried by said main valve closure member for preventing said main valve closure member from moving to said open position when the pressure at said outlet exceeds the pressure at said inlet whereby fluid is prevented from moving from said outlet to said inlet.

11. A unitary pilot-operated relief valve assembly as defined in claim 10 wherein said back-flow-preventer comprises an annular, elastomer seal ring that is biased by pressure differentials existing between said inlet and said outlet whereby the higher pressure at said inlet or said outlet may flow past said seal ring to said pressure-responsive pilot operator.

12. A pilot-operated relief valve, comprising:

a valve housing having an inlet and an outlet, a main valve closure element movable within said housing between open and closed positions for respectively permitting communication and terminating communication between said inlet and said outlet;

a pilot-operating mechanism in said housing responsive to the pressure at said inlet and/or said outlet for regulating the movement of said main valve closure element; and a back-flow-preventer mechanism in said housing and carried in said main valve closure element responsive to the pressure in said inlet and said outlet for preventing said main valve closure element from moving to said open position when the pressure at said outlet is greater than the pressure at said inlet.

13. A pilot-operated relief valve as defined in claim 12 wherein said back-flow-preventer mechanism selectively communicates the higher of the pressures at said inlet or said outlet to said pilot-operating mechanism.

14. A pilot-operated valve as defined in claim 13 wherein said back-flow-preventer mechanism comprises:

an annular, elastomeric seal ring carried in an axially and radially confined annular seat cavity, said seat cavity having a radially inner and a radially outer sealing surface engageable respectively with the radially inner and radially outer surfaces of said seal ring;

an inlet pressure opening communicating with said radially inner surfaces of said seal ring and seat cavity whereby pressure at said inlet tends to unseat said radially inner surfaces and seat said radially outer surfaces of said seal ring and seat cavity; and an outlet pressure opening communicating with said radially outer surfaces of said seal ring and seat cavity whereby pressure at said outlet tends to unseat said radially outer surfaces and seat said radially inner surfaces of said seal ring and seat cavity, said seal ring being responsive to the net seating forces imposed by said inlet and outlet pressures whereby said inlet pressure is prevented from communicating with said pilot-operating mechanism when said outlet pressure is greater than said inlet pressure.

15. A pressure-operated relief valve as defined in claim 14, further comprising an access opening extending through said main valve closure element to communicate inlet or outlet pressure to said pilot-operating mechanism.

16. A pressure-operated relief valve as defined in claim 14, further comprising an access opening valve for closing said access opening to flow when said main valve closure element is in said open position.

17. A pilot-operated relief valve for relieving pressure from a vessel, comprising:

an axially extending main valve closure element movable axially between closed and open positions for respectively closing and opening a discharge path from said vessel, said main valve closure element having a first pressure-responsive seal area at its first axial end selectively sealing said path communicating with said vessel and a second pressure-responsive seal area at its second axial end selectively communicating with a control dome area whereby a pressure differential between said first and second pressure responsive seal areas tends to move said main valve closure element axially;

a pilot-sensing passage extending through said main valve closure element between said first and second pressure-responsive seal areas for communicating the fluid pressure of said vessel to said control dome area;

a sensing passage restriction body movable in response to the pressure in said vessel to a position restricting said passage whereby said main valve closure element is opened when said vessel pressure meets or exceeds a selected pressure value;

a sensing passage closure seal for preventing flow through said sensing passage when said main valve closure element is opened;

wherein said main valve closure element and said pilot-sensing passage are co-axially aligned in a unitary valve housing; and further comprising a back-flow-preventer carried in said unitary valve housing for preventing the reverse flow of pressure fluid between said outlet and said inlet when the pressure at said outlet exceeds the pressure at said inlet.

18. A pilot-operated relief valve for relieving pressure from a vessel, comprising:

an axially extending main valve closure element movable axially between closed and open positions for respectively closing and opening a discharge path from said vessel, said main valve closure element having a first pressure-responsive seal area at its first axial end selectively sealing said path communicating with said vessel and a second pressure-responsive seal area at its second axial end selectively communicating with a control dome area whereby a pressure differential between said first and second pressure responsive seal areas tends to move said main valve closure element axially;

a pilot-sensing passage extending through said main valve closure element between said first and second pressure-responsive seal areas for communicating the fluid pressure of said vessel to said control dome area;

a sensing passage restriction body movable in response to the pressure in said vessel to a position restricting said passage whereby said main valve closure element is opened when said vessel pressure meets or exceeds a selected pressure value;

a sensing passage closure seal for preventing flow through said sensing passage when said main valve closure element is opened; and a back-flow-preventer carried in said main valve closure element for preventing the reverse flow of pressure fluid between said outlet and said inlet when the pressure at said outlet exceeds the pressure at said inlet.

19. A unitary pilot-operated relief valve assembly for controlling the pressure of a fluid contained in a vessel, comprising:

a valve housing having an inlet and outlet;

a main valve closure member contained in said housing, said closure member movable between open and closed positions for respectively permitting and preventing pressure communication between said inlet and said outlet;

a pressure-responsive pilot operator contained in said housing for controlling the movement of said main valve closure member between said open and closed positions;

a pressure-sensing passage extending through said main valve closure member for communicating pressure at said inlet to said pilot operator;

a pressure-responsive passage seal for closing said pressure-sensing passage to flow of fluid when said main valve closure member is in said open position;

a back-flow-preventer mechanism for preventing said main valve closure member from moving to said open position when the pressure at said outlet exceeds the pressure at said inlet whereby fluid is prevented from moving from said outlet to said inlet; and wherein said back-flow-preventer mechanism is carried in said main valve closure member.

20. A unitary pilot-operated relief valve assembly as defined in claim 19, wherein said back-flow-preventer comprises an annular, elastomeric seal ring that is biased by pressure differentials existing between said inlet and said outlet whereby the higher pressure at said inlet or said outlet may flow past said seal ring to said pressure responsive pilot operator.

21. A pilot-operated relief valve, comprising:

a valve housing having an inlet and an outlet, a main valve closure element movable within said housing between open and closed positions for respectively permitting communication and terminating communication between said inlet and said outlet, a pilot-operating mechanism in said housing responsive to the pressure at said inlet and/or said outlet for regulating the movement of said main valve closure element, a back-flow-preventer mechanism in said housing responsive to the pressure in said inlet and said outlet for preventing said main valve closure element from moving to said open position when the pressure at said outlet is greater than the pressure at said inlet, wherein said back-flow-preventer mechanism selectively communicates the higher of the pressures at said inlet or said outlet to said pilot-operating mechanism, and wherein said back-flow-preventer mechanism comprises, an annular, elastomeric seal ring carried in an axially and radially confined annular seat cavity, said seat cavity having a radially inner and radially outer sealing surface engageable respectively with the radially inner and radially outer surfaces of said seal ring, an inlet pressure opening communicating with said radially inner surfaces of said seal ring and seat cavity whereby pressure at said inlet tends to unseat said radially inner surfaces and seat said radially outer surfaces of said seal ring and seat cavity, and an outlet pressure opening communicating with said radially outer surfaces of said seal ring and seat cavity whereby pressure at said outlet tends to unseat said radially outer surfaces and seat said radially inner surfaces of said seal ring and seat cavity, said seal ring being responsive to the net seating forces imposed by said inlet and outlet pressures whereby said inlet pressure is prevented from communicating with said pilot-operating mechanism when said outlet pressure is greater than said inlet pressure.

22. A pilot-operated relief valve as defined in claim 21 wherein said back-flow-preventer mechanism is carried in said main valve closure element.

23. A pressure-operated relief valve as defined in claim 22, further comprising an access opening extending through said main valve closure element to communicate inlet or outlet pressure to said pilot-operating mechanism.

24. A pressure-operated relief valve as defined in claim 22, further comprising an access opening valve for closing said access opening to flow when said main valve closure element is in open position.

* * * * *

UNITED STATES PATENT AND TRADEMARK OFFICE
CERTIFICATE OF CORRECTION

PATENT NO. : 6,161,570
DATED : December 19, 2000
INVENTOR(S) : Michael D. McNeely It is certified that error appears in the above-identified patent and that said Letters Patent are hereby corrected as shown below:

In column 7, line 34, delete "2" and insert --1--
In column 8, line, 23, delete "elastomer" and insert --elastomeric--;
In column 8, line 29, delete "," and insert --;--
In column 10, line 39, delete "pressure responsive" and insert --pressure-responsive--.

Signed and Sealed this

First Day of May, 2001

*Attest:*

NICHOLAS P. GODICI

*Attesting Officer*  Acting Director of the United States Patent and Trademark Office